(12) United States Patent
Desrosiers et al.

(10) Patent No.: US 12,441,452 B2
(45) Date of Patent: Oct. 14, 2025

(54) TURBULENT AIRFLOW DEFLECTOR FOR ROTORCRAFT SLIDING DOOR

(71) Applicant: Textron Innovations Inc., Providence, RI (US)

(72) Inventors: Jeremie Desrosiers, Laval (CA); Victor Laurin-Legault, Saint-Colomban (CA); Gino Drouin, Morin-Heights (CA); Karl Burge, Hurst, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/608,395

(22) Filed: Mar. 18, 2024

(65) Prior Publication Data

US 2025/0289558 A1 Sep. 18, 2025

(51) Int. Cl.
*B64C 1/14* (2006.01)
*B64C 27/04* (2006.01)

(52) U.S. Cl.
CPC ............ *B64C 1/1438* (2013.01); *B64C 27/04* (2013.01); *B64C 1/1484* (2013.01)

(58) Field of Classification Search
CPC ....... B64C 1/14; B64C 1/1423; B64C 1/1438; B64C 1/1476; B64C 1/1484; B60J 5/0493; B60J 10/84
See application file for complete search history.

(56) References Cited

U.S. PATENT DOCUMENTS

| | | | | |
|---|---|---|---|---|
| 5,259,576 A | * | 11/1993 | Howard | B64C 1/1438 244/129.4 |
| 6,189,833 B1 | * | 2/2001 | Ambrose | B64C 1/1438 244/129.5 |
| 2013/0105630 A1 | * | 5/2013 | Klaas | B64C 1/1407 244/129.5 |
| 2018/0290723 A1 | * | 10/2018 | Hill | B64C 1/14 |

FOREIGN PATENT DOCUMENTS

EP 2990329 A1 * 3/2016 ............... B64C 1/14

\* cited by examiner

*Primary Examiner* — Timothy D Collins
(74) *Attorney, Agent, or Firm* — Akona IP PC (57) ABSTRACT

One embodiment is an aircraft including a fuselage; a bubble window provided on a side of the fuselage; a door configured to provide ingress into and egress from an interior of the fuselage through an opening in the side of the fuselage aft of the bubble window; a seal between an edge or surface of the door and an edge of the opening; and a deflector assembly connected to the door and configured to deflect from the seal an airflow created by the bubble window.

20 Claims, 7 Drawing Sheets

TURBULENT AIRFLOW DEFLECTOR FOR ROTORCRAFT SLIDING DOOR

TECHNICAL FIELD

This disclosure relates in general to the field of aircraft and, more particularly, though not exclusively, to a turbulent airflow deflector for a sliding door positioned aft of a bubble window in such aircraft.

BACKGROUND

Certain rotorcraft, such as helicopters, may include one or more rotor systems. One example of a rotorcraft rotor system is a main rotor system. A main rotor system may generate aerodynamic lift to support the weight of the rotorcraft in flight and thrust to counteract aerodynamic drag and move the aircraft in forward flight. Another example of a rotorcraft rotor system is a tail rotor system. A tail rotor system may provide anti-torque and/or directional control for the rotorcraft.

Certain rotorcraft may include a bubble window on one or both sides of the helicopter cockpit. In general, a bubble window is designed to provide increased visibility relative to the corresponding side of the aircraft as compared to an original, flat window. Such increased visibility is especially desirable and increases operational safety during sling loads, firefighting, and other operations during which visibility beneath the helicopter may be essential. A bubble window generates turbulent airflow behind the bubble window, which may cause issues depending on what components are located aft of the bubble window.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this specification, the terms "forward," "aft," "inboard," and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that is farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Figure 1A:
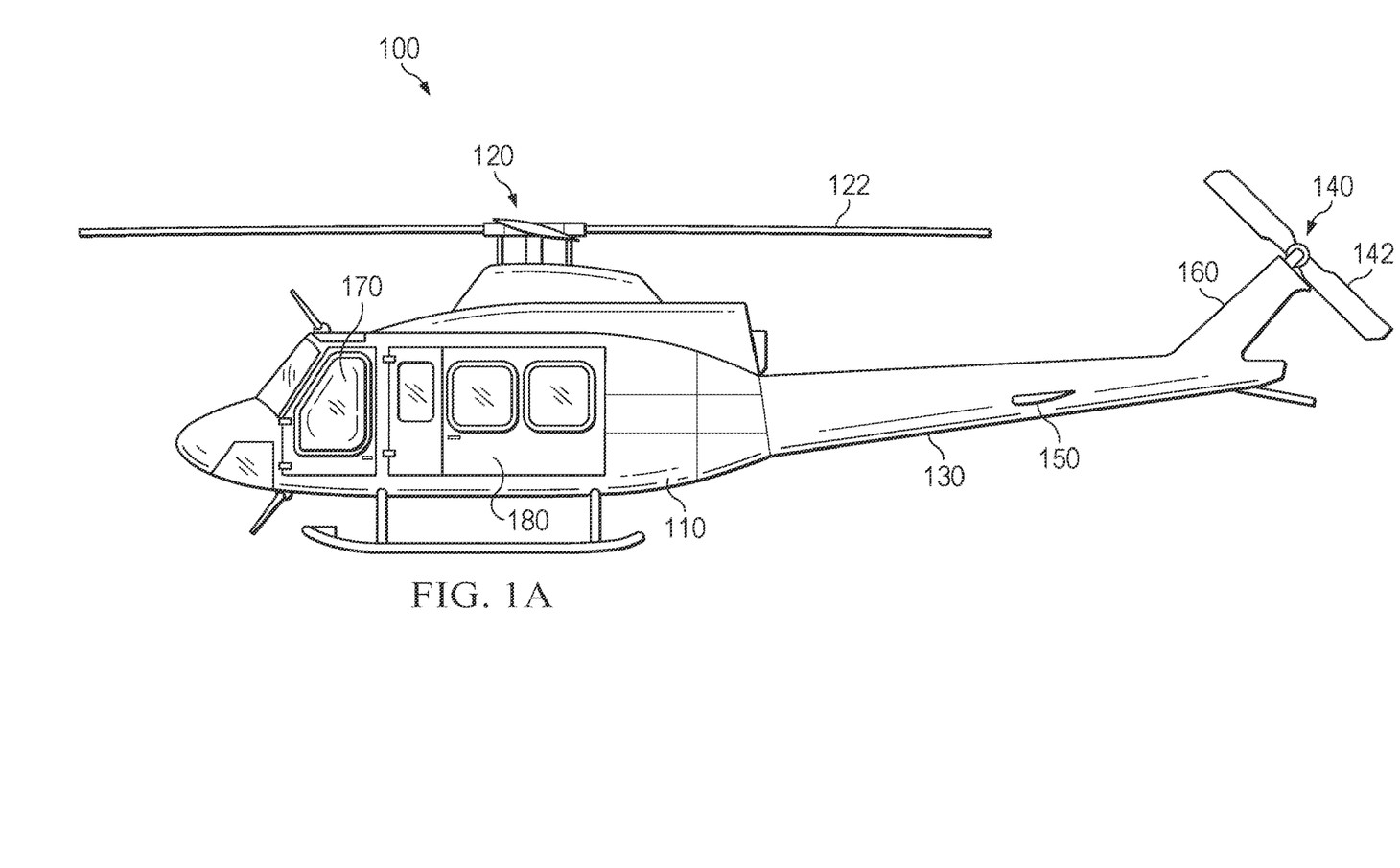
FIGS. 1A and 1B respectively illustrate a side plan view and a front plan view of an example rotorcraft in which embodiments described herein may be implemented.
Figure 1B:
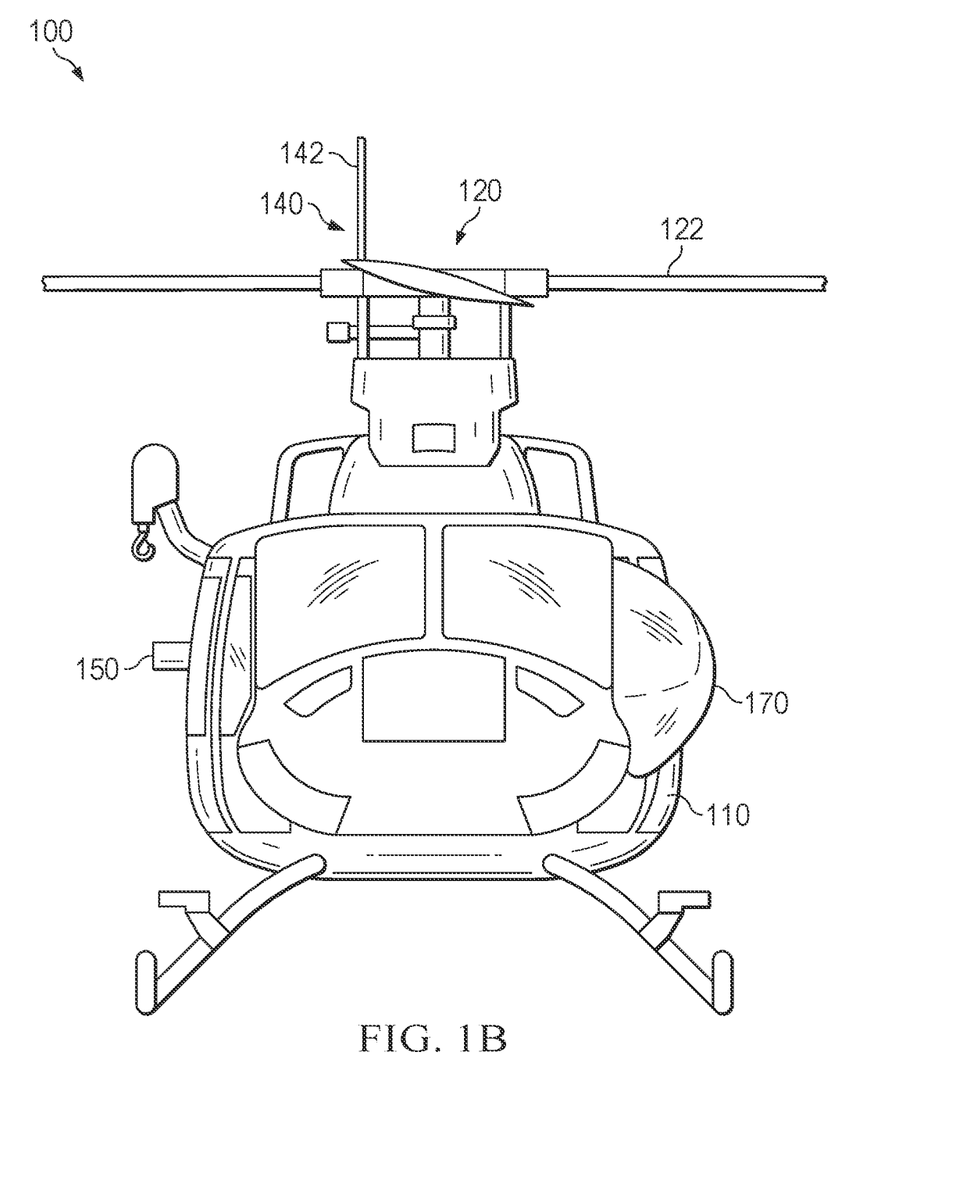

FIGS. 1A and 1B respectively illustrate side and front plan views of an example embodiment of a rotorcraft 100 in which embodiments described herein may be implemented. Rotorcraft 100 includes a fuselage 110, a rotor system (also alternatively referred to as a main rotor system) 120 comprising a plurality of rotating rotor blades 122, and an empennage 130. The fuselage 110 is the main body of the rotorcraft, which may include a cabin or cockpit for the crew, passengers, and/or cargo, and may also house certain mechanical and electrical components, such as one or more engines, transmission systems, and flight controls. The rotor system 120 is used to generate lift for the rotorcraft through rotation of rotor blades 122. For example, torque generated by the engine(s) causes the rotor blades 122 to rotate, which in turn generates lift. Moreover, the pitch of each rotor blade 122 can be adjusted in order to selectively control direction, thrust, and lift for the rotorcraft 100. The empennage 130 is the tail assembly of the rotorcraft. In the illustrated embodiment, the empennage 130 includes a tail rotor system 140, which may be used to provide anti-torque and/or directional control for the rotorcraft 100 using a plurality of rotating rotor blades 142. For example, torque generated by the engine(s) causes the rotor blades 142 to rotate, which in turn provides anti-torque and/or directional control. Blades 142 may provide thrust in the same direction as the rotation of blades 122 so as to counter the torque effect created by rotor system 120 and blades 122. Teachings of certain embodiments recognize that blades 142 may represent one example of a secondary rotor system. Other examples may include, but are not limited to, forward-thrust propellers (e.g., pusher propellers, tractor propellers, etc.), tail anti-torque propellers, ducted rotors, and ducted and mounted inside and/or outside the rotorcraft 100.

In the illustrated embodiment, the empennage 130 also includes a horizontal stabilizer 150 and a vertical stabilizer 160. In general, a stabilizer is an aerodynamic surface or airfoil that produces an aerodynamic lifting force (either positive or negative). For example, a stabilizer may be a fixed or adjustable structure with an airfoil shape and may also include one or more movable control surfaces. The primary purpose of a stabilizer is to improve stability about a particular axis (e.g., pitch or yaw stability), although a stabilizer can also provide other secondary aerodynamic benefits.

A horizontal stabilizer (e.g., horizontal stabilizer 150) is primarily used to provide stability in pitch, or longitudinal stability. For example, both the rotor and fuselage of a rotorcraft typically have an inherent negative stability derivative in pitch, and accordingly, a horizontal stabilizer may be used to neutralize pitch instability and improve the overall handling qualities of the rotorcraft. A horizontal stabilizer may also be used to generate lift for a rotorcraft, for example, to aid in climb or ascent. In some cases, a horizontal stabilizer may also include one or more movable control surfaces, such as an adjustable slat to aid in generating lift. The design of a horizontal stabilizer (e.g., airfoil shape, size, position on a rotorcraft, control surfaces) implicates numerous performance considerations and is often an extremely challenging aspect of aircraft design.

A vertical stabilizer (e.g., vertical stabilizer 160) is primarily used to provide stability in yaw, or directional stability. Although considerable yaw stability and control is often provided by a tail rotor, a vertical stabilizer may be used to supplement the performance of the tail rotor and/or reduce the performance requirements of the tail rotor. Accordingly, designing a vertical stabilizer and a tail rotor often implicates numerous interrelated performance considerations, particularly due to the interaction between their respective airflows. For example, a smaller vertical stabilizer may reduce the adverse effects on tail rotor efficiency but may adversely impact yaw stability and other design requirements (e.g., sideward flight performance, internal capacity for housing components within the vertical stabilizer). Accordingly, various performance considerations must be carefully balanced when designing a vertical stabilizer.

It will be recognized that various embodiments of horizontal and vertical stabilizers with designs that balance a variety of performance considerations to provide optimal performance may be provided. For example, certain embodiments of a horizontal stabilizer may be designed to provide strong aerodynamic performance (e.g., pitch stability and/or generating sufficient lift during climb or ascent) without using slats. Such a horizontal stabilizer may use a tailored airfoil design that is cambered and may form a concave slope on the top surface and/or a convex slope on the bottom surface. In some embodiments, the horizontal stabilizer may be mounted on the aft end of a rotorcraft. By obviating the need for slats, such a horizontal stabilizer design reduces complexity without a performance penalty, thus resulting in a more cost-efficient and reliable solution. Moreover, eliminating the slats similarly eliminates the need to provide anti-icing for the slats, thus providing a further reduction in complexity.

Moreover, certain embodiments of a vertical stabilizer may be designed to provide strong aerodynamic performance. Such a vertical stabilizer may use a tailored airfoil design that satisfies various design criteria, including strong aerodynamic performance (e.g., yaw stability, anti-torque control, minimal flow separation and drag). In some embodiments, for example, the vertical stabilizer may have a cambered airfoil shape that provides the requisite yaw stability and anti-torque control while also minimizing flow separation and drag. The cambered airfoil shape, for example, may enable the vertical stabilizer to provide a portion of the anti-torque required in forward flight (e.g., reducing the anti-torque requirements and power consumption of the tail rotor), and/or may also provide sufficient anti-torque to allow continued flight in the event of a tail rotor failure. The cambered airfoil shape may also enable the vertical stabilizer to provide sufficient aerodynamic sideforce to offset the tail rotor thrust in forward flight, thus minimizing tail rotor flapping and cyclic loads and maximizing the fatigue life of components. Moreover, in some embodiments, the vertical stabilizer may have a blunt trailing edge (rather than a pointed trailing edge) in order to reduce the thickness tapering on the aft end without modifying the desired chord length, thus minimizing flow separation and drag while also reducing manufacturing complexity.

Rotorcraft 100 further includes a full-size bubble window 170 disposed on the co-pilot side of the cabin, or cockpit, portion of fuselage 110. As noted above, bubble window 170 enhances visibility on the side of the rotorcraft (which in the illustrated embodiment is the co-pilot side) on which it is located. Although not illustrated in FIGS. 1A and 1B, a bubble window similar or identical to bubble window 170 may be disposed on the pilot side (i.e., the opposite side) of the cockpit instead of or in addition to bubble window 170. A sliding door 180 is disposed on the side of fuselage 110 aft of bubble window 170. Although as shown in FIGS. 1A and 1B, bubble window 170 is a full-size bubble window, it is anticipated that embodiments described herein may be advantageously deployed in connection with other types of bubble windows. As will be shown and described in greater detail with reference to FIG. 3, in accordance with features of embodiments described herein, a deflector may be provided above the sliding door 180 for deflecting turbulent airflow created by bubble window 170 to reduce or eliminate wear on and noise associated with an upper seal (not shown in FIGS. 1A and 1B) of sliding door 180 due to flutter caused by the airflow, as well as to reduce or eliminate potential water ingress through the opening created by the flutter.

It should be appreciated that rotorcraft 100 shown in FIGS. 1A and 1B is merely illustrative of a variety of aircraft that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples.

Teachings of certain embodiments relating to rotor systems described herein may apply to rotor system 120 and/or other rotor systems, such as tiltrotor and helicopter rotor systems. It should be appreciated that teachings from rotorcraft 100 may apply to aircraft other than rotorcraft, such as airplanes and unmanned aircraft, to name a few examples. In some embodiments, rotorcraft 100 may include a variety of additional components not shown in FIGS. 1A and 1B. For example, rotor system 120 may include components such as a power train, drive shafts, a hub, a swatch plate, and pitch links.

In the example illustrated in FIGS. 1A and 1B, power may be provided from the engines to main rotor blades 122 and tail rotor blades 142 through a combination of drive shafts, gearboxes (e.g., transmission systems) and other components. In some example embodiments, engines provide power through a main rotor gearbox to a rotating mast in mechanical communication with rotor blades 122. In addition, a drive shaft may provide power to a secondary rotor gearbox (e.g., a 90-degree gearbox), which may transit power to rotor blades 142. In these example embodiments, main rotor gearbox may be proximate the fuselage 110, secondary rotor gearbox may be proximate the empennage 130, and drive shaft may be proximate the fuselage and/or the empennage (e.g., extending from the main rotor gearbox to secondary rotor gearbox).

A pilot may manipulate one or more pilot flight controls in order to achieve controlled aerodynamic flight of the rotorcraft 100. Inputs provided by the pilot-to-pilot flight controls may be transmitted mechanically and/or electronically (e.g., via a fly-by-wire flight control system) to flight control devices. Flight control devices may represent devices operative to change the flight characteristics of the aircraft. Examples of flight control devices on rotorcraft 100 may include a control system operable to change the positions of blades 122 and/or 142.

Rotorcraft typically include three sets of pilot flight controls, including cyclic control, collective control, and pedal (for directional) control. Other pilot flight controls may include power control and thrust control. In general, cyclic pilot flight controls may allow a pilot to impart cyclic motions on blades 122 to cause the rotorcraft 100 to tilt in a direction specified by the pilot. For tilting forward and back (pitch) and/or sideways (roll), the angle of attack of blades 122 may be altered cyclically during rotation, creating different amounts of lift at different points in the cycle.

Collective pilot flight controls may allow a pilot to impart collective motions on blades 122 to change the overall lift produced by the blades. For increasing or decreasing overall lift in blades 122, the angle of attack for all blades may be collectively altered by equal amounts at the same time, resulting in ascents, descents, acceleration and/or deceleration.

Anti-torque pilot flight controls may allow a pilot to change the amount of anti-torque force applied to the rotorcraft 100. As noted above, blades 142 may provide thrust in the same direction as the rotation of the blades 122 so as to counter the torque effect created by the rotor system 120 and blades 122. Anti-torque pilot flight controls may change the amount of anti-torque force applied to change the heading of rotorcraft 100. In some embodiments, anti-torque pilot flight controls may change the amount of anti-torque force applied by changing the pitch of the blades 142, increasing or reducing the thrust produced by the blades 142, and causing the nose of the rotorcraft to yaw in the direction of the applied pedal. In some embodiments, the rotorcraft 100 may include additional or different anti-torque devise, such as a rudder or a NOTAR anti-torque device, and the anti-torque pilot flight controls may change the amount of force provide by the additional different anti-torque devices.

The components of rotor systems described herein may comprise any materials suitable for use with an aircraft rotor. For example, rotor blades and other components may comprise carbon fiber, fiberglass, or aluminum; and rotor masts and other components may comprise steel or titanium.

Main rotor and tail rotor flight control systems, including cyclic, collective, and anti-torque controls, may be used to regulate the attitude, altitude, and direction of flight of rotorcraft 100. In accordance with features of embodiments described herein, the flight controls are hydraulically boosted to reduce pilot effort in controlling the airport and to counteract control feedback forces.

Figure 2:
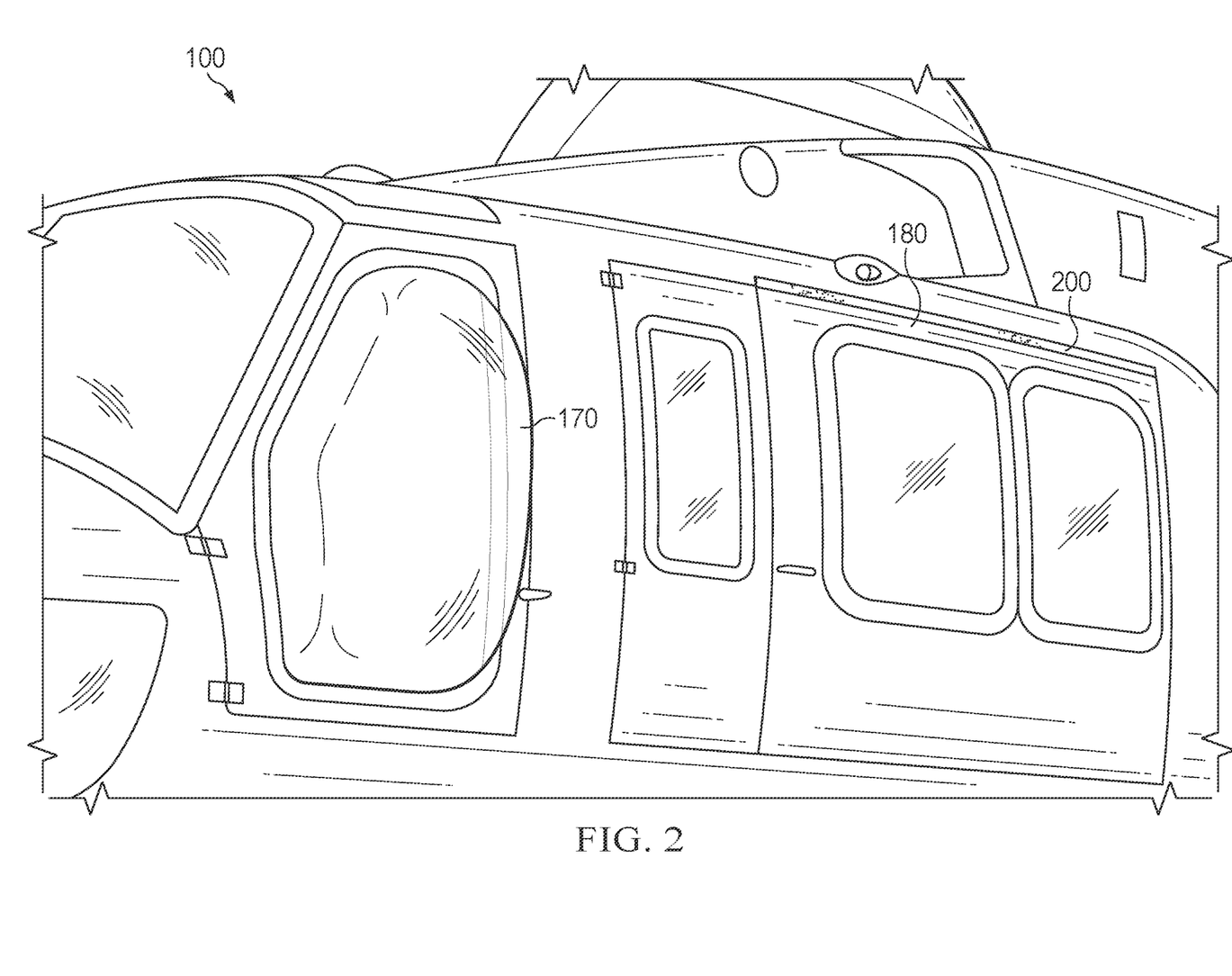
FIG. 2 is a more detailed view of a portion of the example rotorcraft of FIGS. 1A and 1B.

As best illustrated in FIG. 2, a seal 200 is provided to seal the gap that exists between the top, or upper, edge or surface of sliding door 180 and the opening in the side of rotorcraft 100 accessible via sliding door. Ideally, seal 200 provides a barrier against entry of water and/or airflow into the interior cabin of rotorcraft 100; however, turbulent airflow generated by bubble window 170 during operation of rotorcraft 100 causes seal 200 to flutter. The seal flutter precludes proper operation of seal 200 and can result in seal damage over time.

Figure 3:
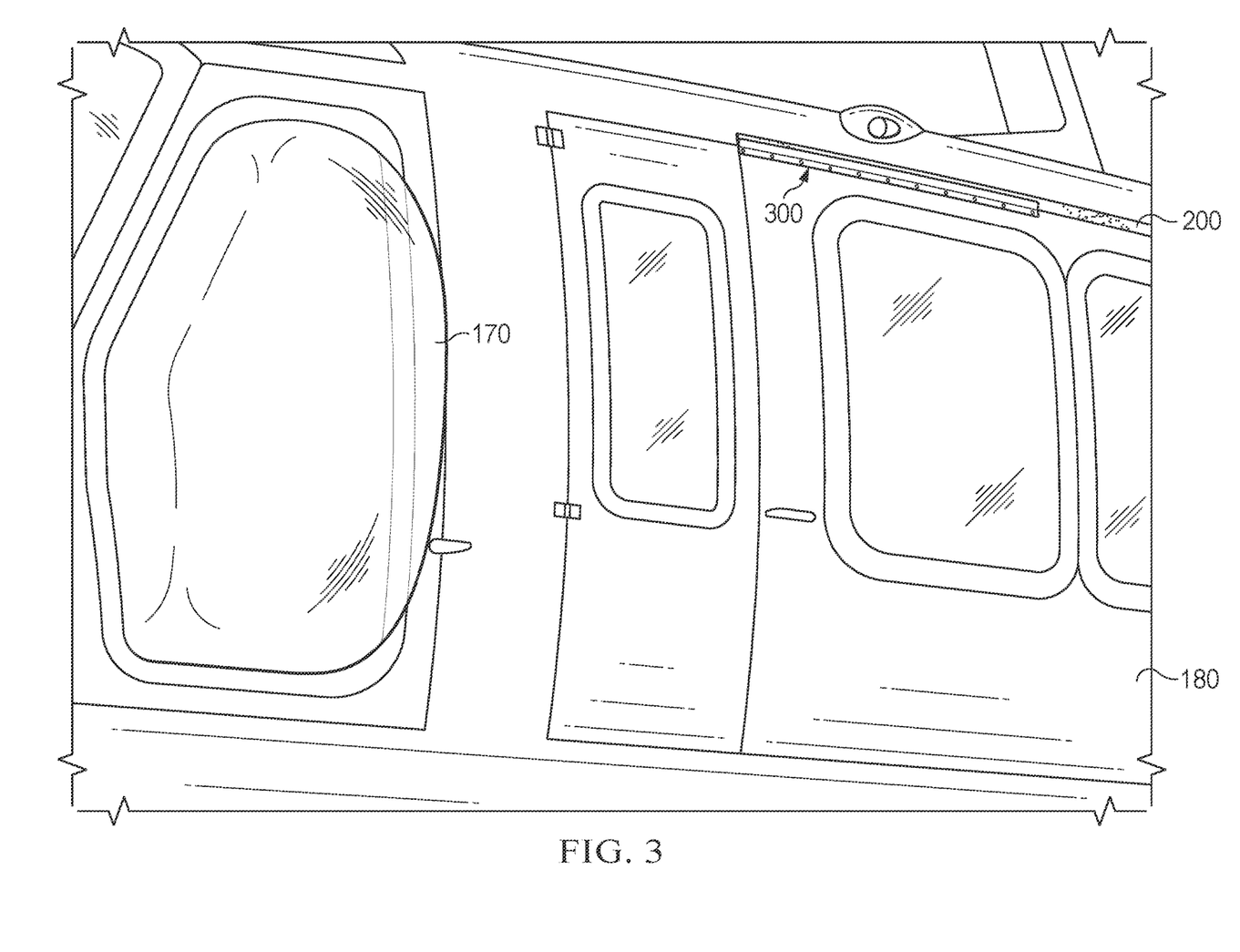
FIG. 3 illustrates a more detailed view of a portion of the example rotorcraft of FIGS. 1A and 1B including an example deflector assembly in accordance with embodiments described herein.
Figure 4A:
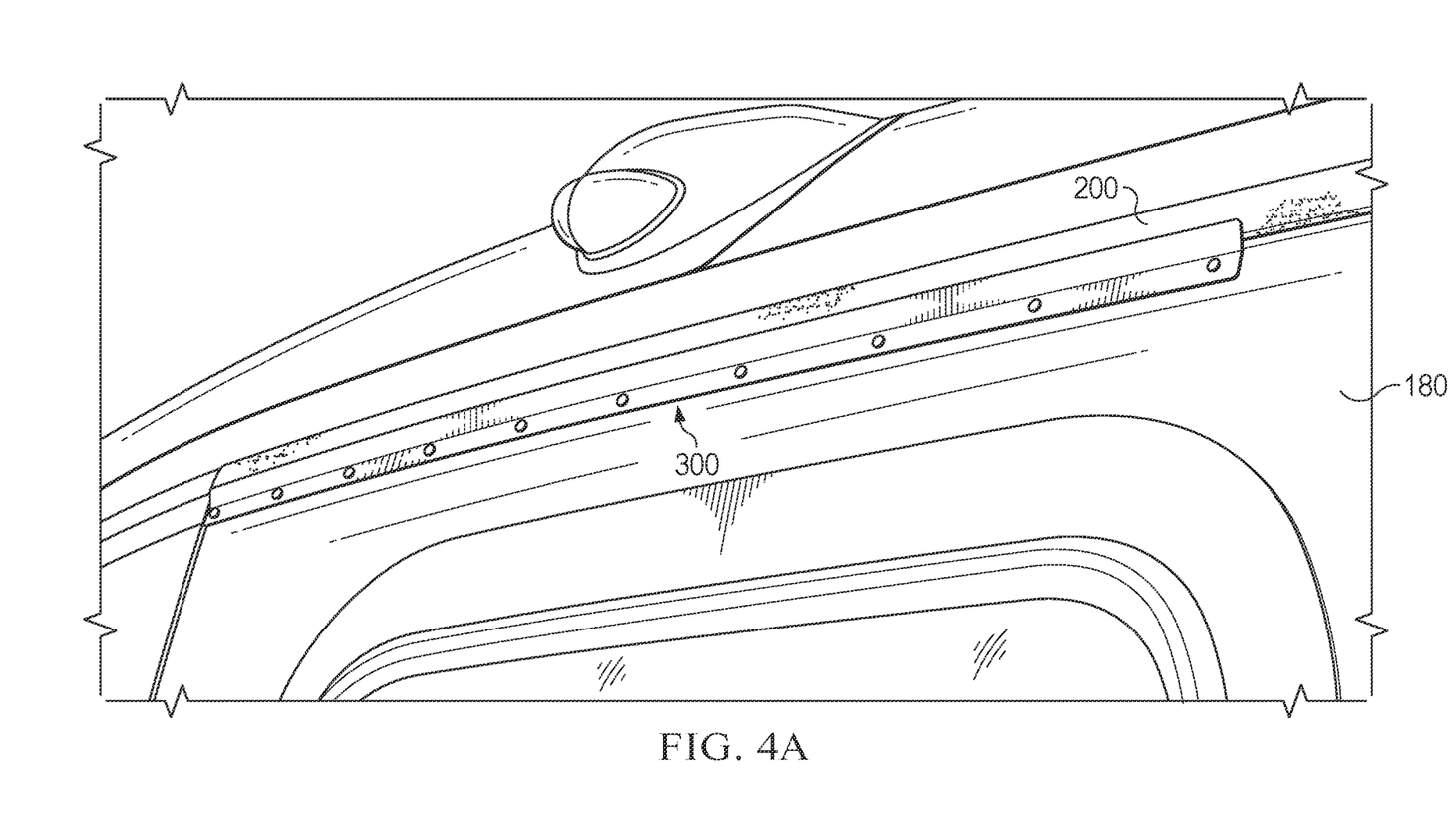
FIGS. 4A, 4B, and 5 illustrate additional details of the example deflector assembly of FIG. 3.
Figure 4B:
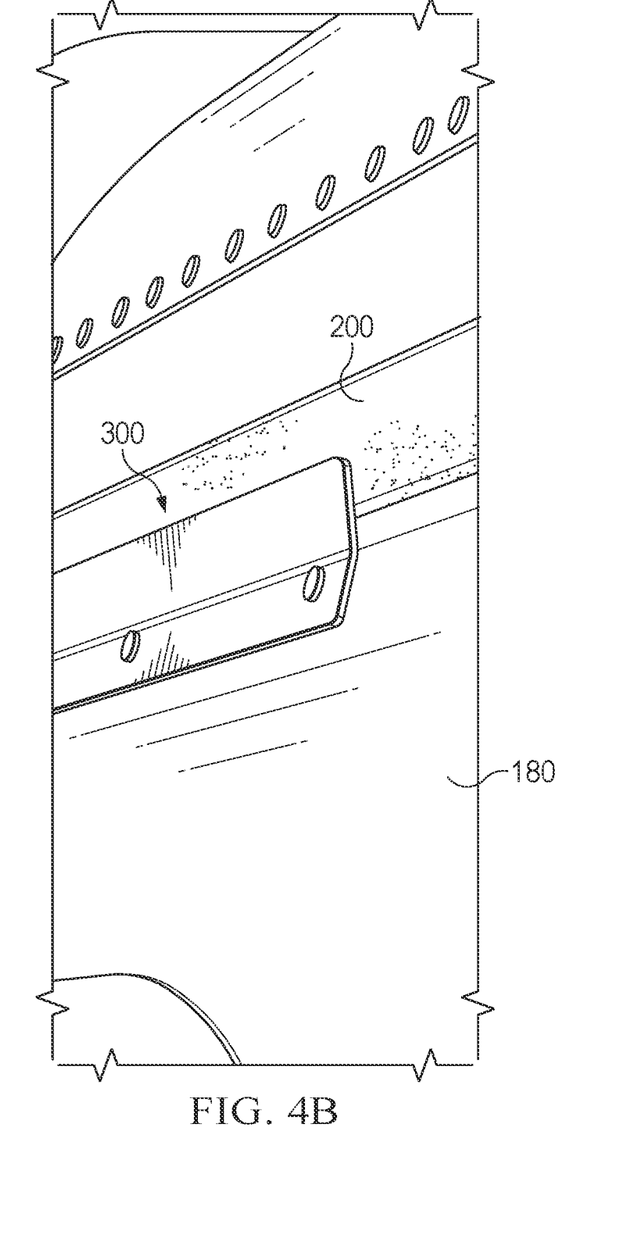

Referring now to FIG. 3, in accordance with features of embodiments described herein, a deflector assembly 300 may be attached to the outer surface, or skin, of sliding door 180 along the top edge or surface thereof to protect or shield seal 200 from turbulent air generated by bubble window 170 (and other sources) by deflecting the air from the seal. FIGS. 4A and 4B illustrate additional details of deflector assembly 300.

Figure 5:
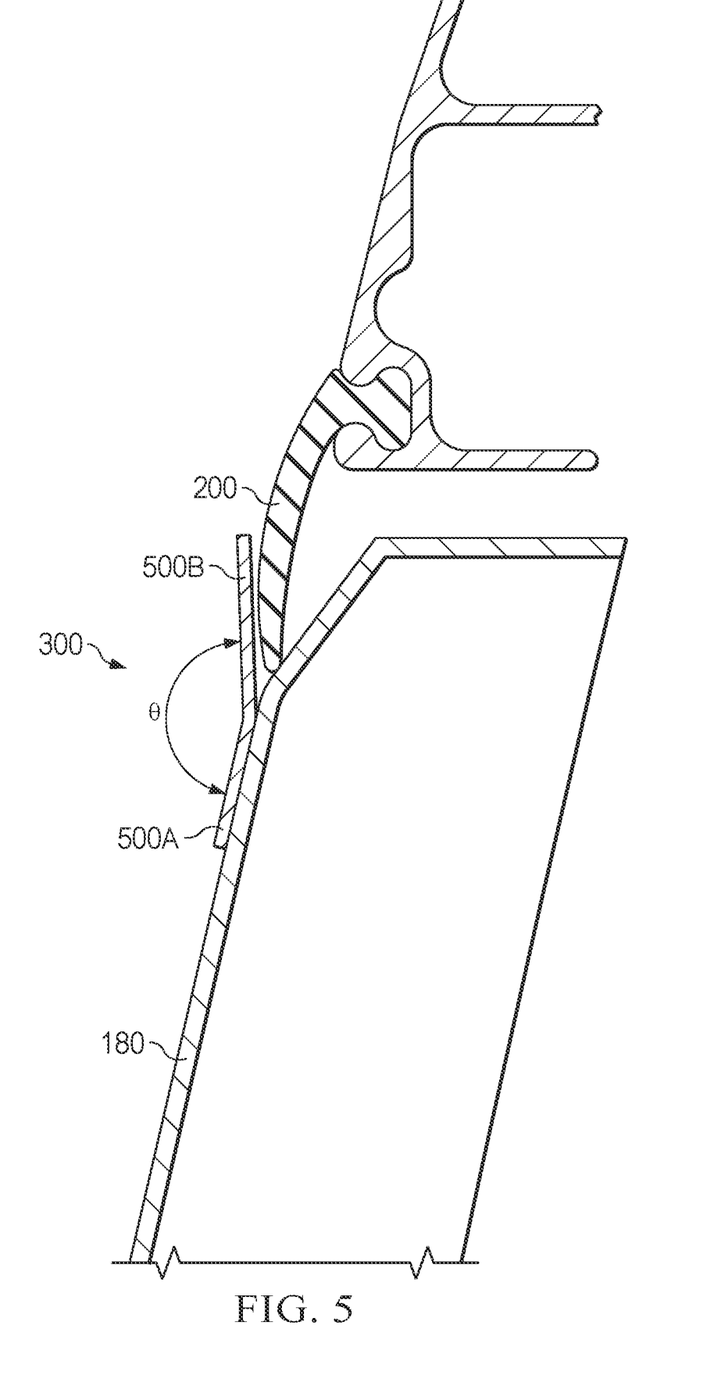

In particular embodiments, as shown in FIG. 5, deflector assembly 300 may include a first longitudinal portion 500A connected to a second longitudinal portion 500B. First longitudinal portion 500A may be connected along a top edge or surface of sliding door 180 using any appropriate attachment mechanism, such as screws, rivets, or bolts, for example, along the length of the portion 500A. In particular embodiments, longitudinal portion 500A is removably attached to sliding door 180. In alternative embodiments, longitudinal portion 500A is more permanently attached to sliding door 180; for example, longitudinal portion 500A may be welded to the surface of sliding door 180. In another alternative embodiment, deflector assembly 300 may be an integral structural component of (i.e., integrated into the design of) sliding door 180. In the illustrated embodiment, an angle $\Theta$ between portions 500A and 500B may be within a range of approximately 160°-170°. In other embodiments, the angle $\Theta$ may be less than or equal to 180°. In particular embodiments, the size of angle $\Theta$ may be dictated by an angle of the surface of sliding door 180 relative to the surface of seal 200. In particular embodiments, the angle $\Theta$ is such that the rotorcraft-facing surface of portion 500B is positioned as close to the outward facing surface of seal 200 as possible without interfering with operation of the seal (e.g., without touching the seal).

In particular embodiments, deflector assembly 300 may be constructed as a sheet metal part and, as described above, may be bent or partially folded lengthwise (e.g., creating first and second portions 500A, 500B) to avoid wear on the seal 200, which may comprise rubber or other appropriate material for forming a seal, when deflector assembly 300 is connected to sliding door 180. Portion 500A of deflector assembly 300 may conform to the surface of sliding door 180.

A length of deflector assembly 300 may be dependent on a path of turbulent airflow along the top edge or surface of sliding door 180. Although as shown in FIG. 3, deflector assembly 300 extends less than 50% of the length of sliding door 180, it will be recognized that deflector assembly may be longer or shorter, depending on the position and location of sliding door 180 with respect to bubble window 170, as well as the size and shape of bubble window 170 and the magnitude and path of the turbulent air generated by bubble window 170 during operation of rotorcraft 100. In some cases, it may be desirable to prevent any turbulent air from reaching seal 200; in other cases, it may be acceptable to prevent only some portion of such turbulent air from reaching seal 200.

Embodiments of deflector assembly 300 as described herein are simple to fabricate and install and protect the sliding door upper seal from detrimental airflow conditions without requiring significant changes to be made to the structure of the rotorcraft and without direct contact between the deflector and seal. Embodiments further reduce wear on the upper seal due to flutter caused by turbulent airflow and reduces and/or eliminates the possibility of water ingress.

Example 1 provides an aircraft including a fuselage; a bubble window provided on a side of the fuselage; a door configured to provide ingress into and egress from an interior of the fuselage through an opening in the side of the fuselage aft of the bubble window; a seal between an edge or surface of the door and an edge of the opening; and a deflector assembly connected to the door and configured to deflect from the seal an airflow created by the bubble window.

Example 2 provides the aircraft of example 1, in which the seal is located between the opening and an upper edge or surface of the door.

Example 3 provides the aircraft of example 1 or 2, in which the door includes a sliding door.

Example 4 provides the aircraft of any one of examples 1-3, in which the seal is connected to the fuselage along a top edge of the opening.

Example 5 provides the aircraft of any one of examples 1-4, in which the deflector assembly is removably connected to the door.

Example 6 provides the aircraft of any one of examples 1-5, in which the deflector assembly is permanently connected to the door.

Example 7 provides the aircraft of any one of examples 1-6, in which the deflector assembly includes a first longitudinal portion and a second longitudinal portion disposed at an angle $\Theta$ with respect to the first longitudinal portion.

Example 8 provides the aircraft of example 7, in which the first longitudinal portion is connected to the door and the second longitudinal portion covers an exterior surface of the seal.

Example 9 provides the aircraft of example 7 or 8, in which the angle $\Theta$ is less than or equal to 180 degrees.

Example 10 provides the aircraft of any one of examples 1-9, in which the seal extends along an entire length of an upper edge or surface of the door and the deflector assembly extends along a first length of the door.

Example 11 provides the aircraft of example 10, in which the first length of the door is less than the entire length of the upper edge or surface of the door.

Example 12 provides the aircraft of any one of examples 1-11, in which the aircraft includes a rotorcraft.

Example 13 provides a deflector assembly for a rotorcraft including a seal between an opening in a fuselage of the rotorcraft and an edge or surface of a door configured to selectively cover the opening, the deflector assembly including a first longitudinal portion and a second longitudinal portion disposed at an angle $\Theta$ with respect to the second longitudinal portion, in which the first longitudinal portion is connected along an edge or surface of the door proximate the seal and the second longitudinal portion covers an exterior surface of the seal.

Example 14 provides the deflector assembly of example 13, in which the edge or surface of the door includes an upper edge or surface of the door and in which the seal is connected to the fuselage along an upper edge of the opening.

Example 15 provides the deflector assembly of example 13 or 14, in which the door includes a sliding door.

Example 16 provides the deflector assembly of any one of examples 13-15, in which the deflector assembly is configured to be removably connectable to the door.

Example 17 provides the deflector assembly of any one of examples 13-16, in which the first longitudinal portion is bent at an angle $\Theta$ with respect to the second longitudinal portion.

Example 18 provides the deflector assembly of any one of examples 13-17, in which the first longitudinal portion is configured to be connected to the door and the second longitudinal portion is configured to cover an exposed surface of the seal.

Example 19 provides a deflector assembly for a rotorcraft including a fuselage, a bubble window in a side of the fuselage, a sliding door configured to selectively cover an opening in the side of the fuselage, and a seal between an upper edge or surface of the sliding door and an edge of the opening, the deflector assembly configured to be connected along the upper edge or surface of the sliding door to deflect from the seal a turbulent airflow generated by the bubble window when the rotorcraft is in flight.

Example 20 provides the deflector assembly of example 19, further including a first longitudinal portion and a second longitudinal portion bent at an angle $\Theta$ with respect to the first longitudinal portion, in which the first longitudinal portion is connected along the upper edge or surface of the sliding door and the second longitudinal portion shields an exterior surface of the seal.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C. The terms "substantially," "close," "approximately," "near," and "about," generally refer to being within +/−5-20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An aircraft comprising:
   a fuselage;
   a bubble window provided on a side of the fuselage;
   a door configured to provide ingress into and egress from an interior of the fuselage through an opening in the side of the fuselage aft of the bubble window;
   a seal between an edge or surface of the door and an edge of the opening; and
   a deflector assembly connected to the door and configured to deflect an airflow created by the bubble window away from the seal, the deflector assembly comprising a first longitudinal portion and a second longitudinal portion;
   wherein a length of the first longitudinal portion is substantially coextensive with a length of the second longitudinal portion.

2. The aircraft of claim 1, wherein the seal is located between the opening and an upper edge or surface of the door.

3. The aircraft of claim 1, wherein the door comprises a sliding door.

4. The aircraft of claim 1, wherein the seal is connected to the fuselage along a top edge of the opening.

5. The aircraft of claim 1, wherein the deflector assembly is removably connected to the door.

6. The aircraft of claim 1, wherein the deflector assembly is permanently connected to the door.

7. The aircraft of claim 1, wherein a long edge of the first longitudinal portion is connected to a long edge of the second longitudinal portion such that the second longitudinal portion is disposed at an angle Θ with respect to the first longitudinal portion.

8. The aircraft of claim 7, wherein the first longitudinal portion is connected to the door and the second longitudinal portion covers an exterior surface of the seal.

9. The aircraft of claim 7, wherein the angle Θ is greater than 90 degrees and less or equal to than 180 degrees.

10. The aircraft of claim 1, wherein the seal extends along an entire length of an upper edge or surface of the door and the deflector assembly extends along a first length of the door.

11. The aircraft of claim 10, wherein the first length of the door is less than or equal to the entire length of the upper edge or surface of the door.

12. The aircraft of claim 1, wherein the aircraft comprises a rotorcraft.

13. A deflector assembly for a rotorcraft comprising a seal between an opening in a fuselage of the rotorcraft and an edge or surface of a door configured to cover the opening, the deflector assembly comprising a first longitudinal portion and a second longitudinal portion disposed at an angle Θ with respect to the second longitudinal portion, wherein the first longitudinal portion is connected along an edge or surface of the door proximate the seal and the second longitudinal portion covers an exterior surface of the seal, and wherein a length of the first longitudinal portion is substantially identical to a length of the second longitudinal portion.

14. The deflector assembly of claim 13, wherein the edge or surface of the door comprises an upper edge or surface of the door and wherein the seal is connected to the fuselage along an upper edge or surface of the opening.

15. The deflector assembly of claim 13, wherein the door comprises a sliding door.

16. The deflector assembly of claim 13, wherein the deflector assembly is configured to be removably connectable to the door.

17. The deflector assembly of claim 13, wherein a long edge of the first longitudinal portion is connected to a long edge of the second longitudinal portion.

18. The deflector assembly of claim 13, wherein the angle Θ is greater than 90 degrees and less or equal to than 180 degrees.

19. A deflector assembly for a rotorcraft comprising a fuselage, a bubble window in a side of the fuselage, a sliding door configured to cover an opening in the side of the fuselage, and a seal between an upper edge or surface of the sliding door and an edge of the opening, the deflector assembly comprising a first longitudinal portion configured to be connected along the upper edge or surface of the sliding door and a second longitudinal portion connected along a long edge thereof to a long edge of the first longitudinal portion, the second longitudinal portion arranged to deflect a turbulent airflow generated by the bubble window when the rotorcraft is in flight away from the seal, wherein a length of the first longitudinal portion is substantially coextensive with a length of the second longitudinal portion.

20. The deflector assembly of claim 19, wherein the second longitudinal portion is bent at an angle Θ with respect to the first longitudinal portion.

* * * * *